Figure 1:
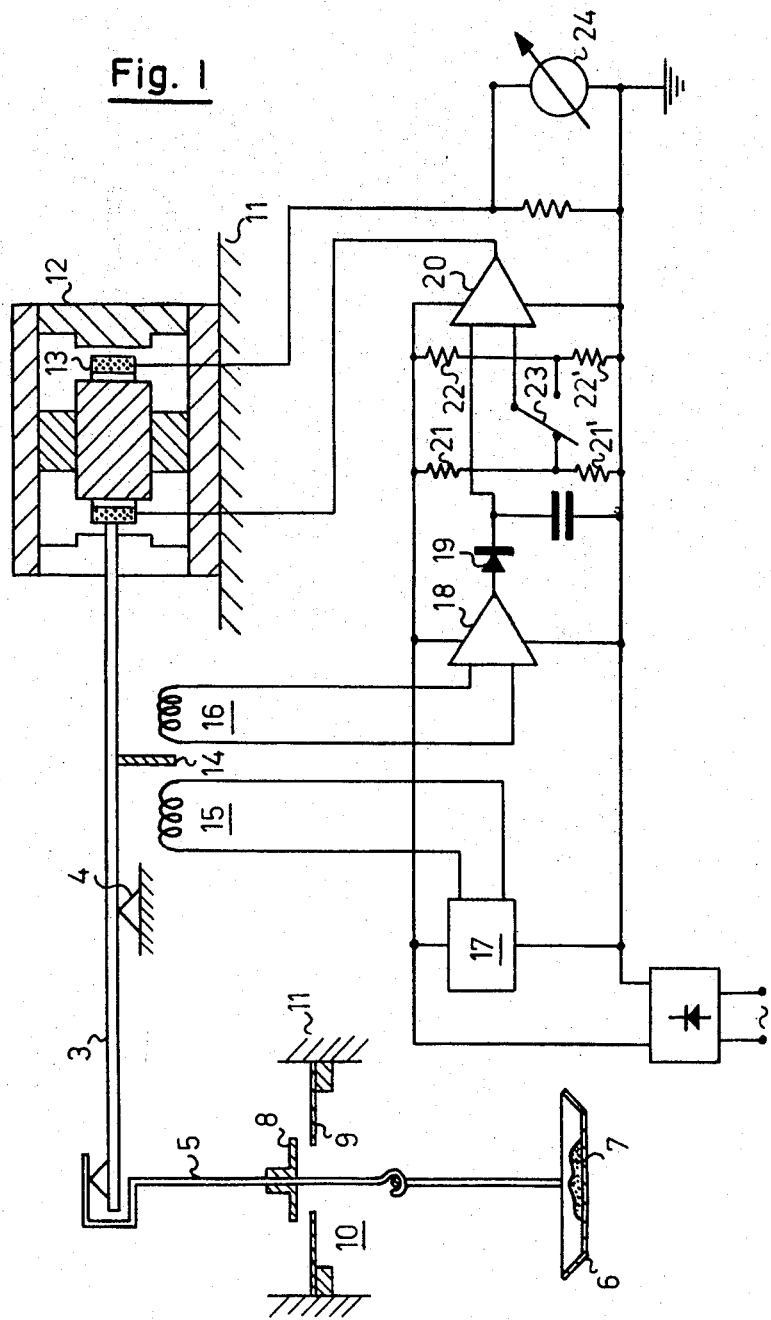

United States Patent

Baumgartner

[15] 3,677,357
[45] July 18, 1972

[54] ELECTROMAGNETIC LOAD COMPENSATED WEIGHING APPARATUS INCLUDING DAMPING

[72] Inventor: Max Baumgartner, Etzelstrasse 4, CH-8712, Stafa, Switzerland

[22] Filed: May 21, 1971

[21] Appl. No.: 145,718

[30] Foreign Application Priority Data

June 18, 1970  Switzerland..........................8618/70

[52] U.S. Cl..............................177/188, 177/210, 177/212
[51] Int. Cl.....................G01g 1/22, G01g 7/04, G01g 23/06
[58] Field of Search..........................177/184, 185, 187–189, 177/210, 212

[56] References Cited

UNITED STATES PATENTS

| | | |
|---|---|---|
| 2,661,201 | 12/1953 | Bowes....................................177/188 |
| 2,940,747 | 6/1960 | Eder et al. ............................177/212 |
| 3,133,606 | 5/1964 | Thomson..............................177/212 |
| 3,172,493 | 3/1965 | Von Koch et al......................177/185 |
| 3,355,015 | 11/1967 | Cervin...................................177/184 |
| 3,519,095 | 7/1970 | Tomes...................................177/212 |

*Primary Examiner*—Robert S. Ward, Jr.
*Attorney*—Lawrence E. Laubscher

[57] ABSTRACT

Weighing apparatus of the electromagnetic load compensation type including a vertically movable load suspension member, characterized by the provision of damping means for damping pendulum oscillations of the load suspension member when said member is in a given damping position relative to the frame of the apparatus, and control means for interrupting the weighing operation of the apparatus and for utilizing the electromagnetic load compensating means to place the load suspension member in the damping position.

10 Claims, 2 Drawing Figures

ELECTROMAGENTIC LOAD COMPENSATED WEIGHING APPARATUS INCLUDING DAMPING

This invention relates generally to electromagnetic weighing apparatus, and more particularly, to weighing apparatus which operates on the principle of electromagnetic load compensation.

Weighing apparatus of this kind are generally in the form of beam balance weighing machines. Conventional constructions include at one end of the balance beam load means comprising suspension means and/or a weighing pan, and at the other end there are provided electromagnetic means for load compensation (for example, in the form of a moving coil system), indicating means being provided for indicating the position of the balance beam (for example in the form of an inductive sensing system).

In order to achieve the degree of precision which is required, particularly in the case of micro and ultra-micro weighing machines, it is necessary inter alia to damp troublesome oscillations. The oscillations of the balance beam in the direction of inclination and thus the longitudinal oscillations of the load portion are damped by the compensation system itself, so that special devices for that purpose are not required. The same also applies to beam-less weighing machines, as regards the longitudinal oscillations of the load portion.

However, the situation is different in the case of pendulum oscillations of the weighing pan and the suspension means, which oscillations can be produced, for example, by external vibration. The damping effect which can be achieved for example, by using taut straps of suitable rigidity for suspending the load portion is not sufficient to meet the requirement for rapid oscillation damping. This requirement is of great importance, with a view to achieving the highest possible weighing speeds in individual weighing operations and the shortest possible interruptions in reproducing meaningful measuring results when carrying out long-duration gravimetric experiments.

This gives rise to the necessity of an additional damping device for the load portion.

Damping devices of that kind are known per se in the case of conventional beam weighing machines, whether in the form of weighing pan brake means which act upwardly on the weighing pan (as disclosed, for example, in the German Pats. Nos. 965,081 and 1,045,675, and the British Pat. No. 771,010), or suspension braking means (for example German Pat. No. 1,246,264 and U.S. Pat. No. 3,074,498). These damping devices are all brought into operative connection by mechanical means. Concerning electromagnetic weighing machines, however, it proves to be useful not to operate the said damping devices mechanically. Mechanical operation would cause in this case a rather expensive construction. Moreover, in certain cases, e.g., for weighing in a vacuum, there would arise additional difficulties in design.

Accordingly, a primary object of the present invention is to provide improved weighing apparatus which operates on the principle of electromagnetic load compensation, comprising a load portion formed by suspension means and/or a weighing pan, mechanical damping means for damping pendulum oscillations of the load portion, electromagnetic load compensation means, and means for controlling the load compensation means to interrupt the weighing operation and bring about operation of the damping means.

Preferably the damping means comprises a movable portion fixed to the load portion of the machine, and a fixed portion, and the damping means is brought into operation when the load portion is moved vertically to bring the two portions of the damping device into contact, by means of a variation in the reference voltage corresponding to the position of equilibrium of the weighing machine sensing system.

Depending on the particular construction, the control means can be operated manually as required, or can be periodically operated. The latter arrangement is particularly recommended when the damping means includes electrically conductive materials utilized to conduct away electrostatic charges, which may be found necessary particularly when carrying out long-duration gravimetric experiments in particular media or in a vacuum, as certain forms of micro and ultra-micro weighing machines have non-conductively arranged suspension means. Thus, in many beam weighing machines, the suspension means are carried on the balance beam by way of sapphire bearings.

It is also possible for initiation of the variation in compensation force, which variation produces the damping connection, to be rendered automatic for some cases, for example when the course of a long-duration weighing operation is plotted by way of a recording pen and the registration curve is rendered discontinuous due to sudden vibration and consequent oscillations of the load portion. By taking suitable precautions, the above mentioned variation in compensation force can be produced automatically in such cases.

In a further aspect of the invention, it is found desirable for the operation as such of varying the compensation force to be varied, depending on specific requirements. In the simplest case the variation consists of a sudden reduction in the compensation current, whereupon the load portion of the weighing machine will move downwardly with a jerk under the effect of its weight until reaching the damping position defined for example by a mechanical stop. Likewise, the load portion will move relatively rapidly upwardly after the original value of the compensation current has been restored. In cases in which a rapid movement of this kind is not desired, means can be provided to allow the load portion to return gradually into the weighing position, and possibly also similarly as regards deflection of the load portion into the damping position. In this way, any secondary oscillations which might be produced as a result of the jerky movements of the load portion are avoided.

It may further de desirable for the variation in the compensation current to be adapted by suitable means to the particular weighing range, in order to obtain movements which are always substantially identical.

Figure 2:
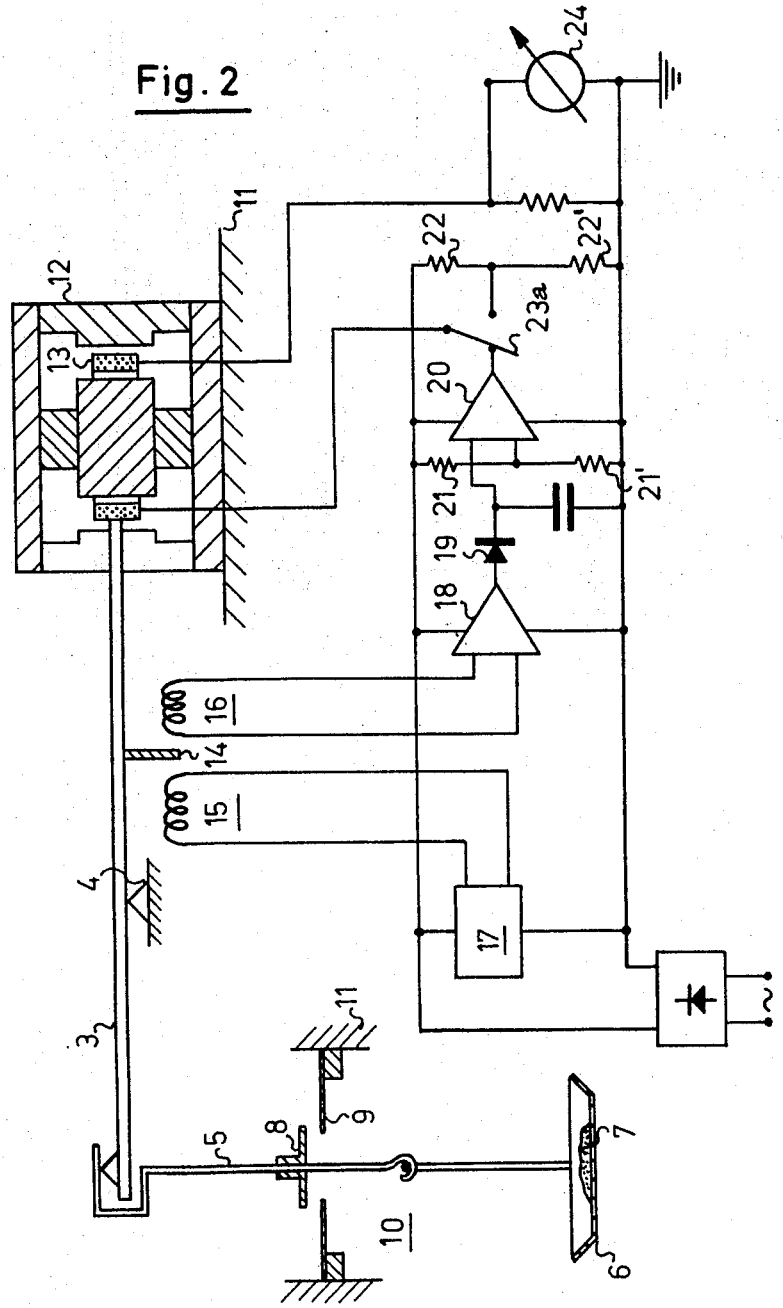

Other objects and advantages of the invention will become apparent from the following specification when viewed in the light of the accompanying drawing, in which:

FIG. 1 is an electrical schematic diagram of a first embodiment of the invention; and FIG. 2 is a similar schematic diagram of an alternate embodiment of the invention.

Referring first to FIG. 1, the balance beam 3 is pivotally mounted at the fulcrum point 4 and carries at one end the suspension means 5 that support the weighing pan 6 which receives the material 7 to be weighed. Secured to the suspension means 5 is a movable damping element 8 which, upon lowering of the suspension means 5, comes into operative damping engagement with the friction faces 9 of the stationary damping element 10 which is mounted on the fixed part 11 of the weighing machine.

Arranged at the other end of the balance beam 3 is the compensation means including a ferromagnetic armature 12 carried by the fixed part 11 of the weighing machine, and the moving coil 13 connected with the free end of the beam 3.

A lug 14 secured to the beam 3 extends between the stationary pair of coils 15 and 16. Coil 15 is supplied with high-frequency alternating current from the oscillator 17 and induces in the coil 16 an alternating-current voltage which is dependent on the position of the lug 14 and which is fed to the amplifier 18, rectified by the rectifier 19 and applied to the differential amplifier 20 via the bridge circuit including resistors 21, 21', 22, 22'. In the illustrated weighing position of the switch 23, the voltage difference at the amplifier 20 is determined by the position of the lug 14 (actual voltage) and by the value of weighing resistor 21' (reference voltage) relative to resistor 21. The amplifier 20 supplies the necessary current for the compensation coil 13 until the voltage difference, apart from the regulating error, becomes zero (that is to say, when a condition of equilibrium is achieved). The coil current is a measure of the weight of the material 7 and is indicated in units of weight by way of digital voltmeter 24 or similar indicator means.

When the switch 23 is operated, the voltage difference, independently of the weight of the load portion, is determined in accordance with a second reference voltage that is a function of the value of damping resistor 22' relative to resistor 22. This second reference voltage is so selected that the actual voltage which corresponds thereto and which is determined by the position of the lug 14 will be achieved when the two damping elements 8 and 9 come into operative connection, by virtue of the inclination of the balance beam 3.

OPERATION

Assume that the first reference voltage established by resistor 21' is such that when the pan 6 is empty and the balance beam 3 is in a balanced equilibrium position, the output voltage of amplifier 20 equals zero. Assume also that the second reference voltage established by resistor 22' is such as to produce a current flow in coil 13 which will result in beam 3 being pivoted to lower suspension means 5 to the damping position in which movable damping element 8 engages stationary damping elements 9.

As material 7 is added to the pan 6 with switch 23 in the illustrated weighing position, beam 3 pivots in the counterclockwise direction to displace lug 14 upwardly relative to the coils 15 and 16, whereby the input voltages to amplifier 20 are unbalanced, and amplifier 20 presents an output voltage to coil 13 that tends to return beam 3 to the equilibrium position. The amplitude of this coil current, as indicated by the meter 24, is a function of the weight of the material deposited in the pan.

To damp pendulum oscillations of the pan 6 and suspension means, switch 23 is operated (manually or mechanically) to the damping position, whereupon a second output current is provided by differential amplifier 20 that is a function of the second reference voltage produced by resistor 22'. The flow of this output current through coil 13 causes beam 3 to be pivoted to lower suspension means 5 to the damping position, whereupon movable damping element 8 engages stationary damping element 9. When switch 23 is returned to the weighing position, the first reference voltage is again supplied to the amplifier 20 for comparison with the voltage signal from coil 16, and the weighing operation is resumed.

Referring now to FIG. 2, the second embodiment is characterized by the arrangement of the first pair of resistors 21, 21' between the amplifiers 18 and 20, and the second pair of resistors 22, 22' between the amplifier 20 and the indicator means 24. Consequently, the compensation current of the moving coil 13 is directly reduced to produce the operative connection of the damping means 8, 9.

The figure again shows switch 23a in the position which corresponds to the weighing operation. In order to damp oscillations of the suspension means, the switch 23a is operated and the coil current is now determined by the size of the resistor 22' relative to that of resistor 22.

In both arrangements, the weight indicator means 24 does not supply any meaningful result during the oscillation damping action (i.e, during the establishment of the second reference voltage determined by the resistor 22').

Further uses of the principle according to the invention are obvious (as, for example, in beamless electromagnetically compensating weighing apparatus).

While in accordance with the provisions of the Patent Statutes the preferred forms and embodiments of the invention have been illustrated and described, it will be apparent that various changes may be made without deviating from the inventive concept.

What is claimed is:

1. Weighing apparatus, comprising a frame (11); support means including a vertical load suspension member (5) connected with said frame for movement in a weighing direction upon the application of a weighing force thereto;
electromagnetic load compensating means (12, 13) for applying to said support means a compensating force in opposition to said weighing force;
mechanical damping means (10) operable when said load suspension member is a given damping position relative to said frame for damping pendulum oscillations of said suspension member; and
control means for temporarily interrupting the weighing operation of said apparatus and for operating said electromagnetic load compensation means to place said load suspension member in said damping position.

2. Apparatus as defined in claim 1, wherein said load compensation means includes means (21') establishing a reference voltage to effect an equilibrium condition of said support means relative to said frame, said control means being operable to vary said reference voltage to cause operation of said mechanical damping means.

3. Apparatus as defined in claim 2, wherein said load compensation means includes armature (12) and compensating coil (13) elements one of which is connected with said frame and the other of which is connected with said support means, respectively, said damping operation being effected by variation of the current in the said compensating coil.

4. Apparatus as defined in claim 1, wherein said electromagnetic load compensating means comprises associated armature (12) and compensating coil (13) portions one of which is connected with said frame and the other of which is connected with said support means, respectively, and means for effecting a flow of current through said compensating coil as a function of the degree of displacement of said support means by said weighing force from an equilibrium position relative to said frame.

5. Apparatus as defined in claim 4, wherein said means for effecting flow of current through said compensating coil comprises associated sensing coil and metal lug elements (14, 15, 16) at least one of which is connected with said frame and the other of which is connected with said support means.

6. Apparatus as defined in claim 5, and further including equilibrium balancing means for causing the current flow through said compensating coil when said support means is in the equilibrium position relative to said frame, said equilibrium balancing means including means (21') establishing a first reference voltage, and means (20) for comparing the signal from said sensing coil with said first reference voltage to produce a resultant control voltage that is applied across said compensating coil.

7. Apparatus as defined in claim 6, wherein said control means further includes means (22') establishing a second reference voltage, and switch means (23) for substituting said second reference voltage for said first reference voltage, thereby effecting displacement of the load suspension means to the damping position.

8. Apparatus as defined in claim 6, wherein said control means further includes means (22') establishing a second reference voltage, and switch means (23a) for isolating said comparison means from, and for connecting said second reference voltage to, said compensating coil.

9. Apparatus as defined in claim 1, wherein said support means includes a balance beam (3) pivotally connected intermediate its ends with said frame, said suspension means being suspended frome one end of said beam and said electromagnetic load compensation means being arranged adjacent the other end of said beam.

10. Apparatus as defined in claim 4, and further including indicating means responsive to the flow of current through said load compensating means for indicating the weight of an object positioned on said load suspension member.

* * * * *

UNITED STATES PATENT OFFICE
CERTIFICATE OF CORRECTION

Patent No. 3,677,357    Dated  July 18, 1972

Inventor(s) Max Baumgartner

It is certified that error appears in the above-identified patent and that said Letters Patent are hereby corrected as shown below:

In the Heading:

Assignee: Mettler Instrumente AG, Zurich, Switzerland

Signed and sealed this 17th day of April 1973.

(SEAL)
Attest:

EDWARD M. FLETCHER, JR.
Attesting Officer

ROBERT GOTTSCHALK
Commissioner of Patents